(12) United States Patent
Burdgick et al.

(10) Patent No.: US 7,766,625 B2
(45) Date of Patent: Aug. 3, 2010

(54) METHODS AND APPARATUS FOR REDUCING STRESS IN TURBINE BUCKETS

(75) Inventors: Steven S. Burdgick, Schenectady, NY (US); Christophe Lanaud, Delanson, NY (US); Adegboyega Makinde, Niskayuna, NY (US); Wendy Lin, Niskayuna, NY (US); Grama Praveen, Clifton Park, NY (US); Amitabh Bansal, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 11/396,046

(22) Filed: Mar. 31, 2006

(65) Prior Publication Data
US 2007/0231154 A1 Oct. 4, 2007

(51) Int. Cl.
F01D 5/14 (2006.01)
(52) U.S. Cl. ...................... 416/230; 416/190
(58) Field of Classification Search .............. 416/190, 416/232, 227 R, 231 R, 231 B, 233
See application file for complete search history.

(56) References Cited

U.S. PATENT DOCUMENTS

| | | | |
|---|---|---|---|
| 3,897,171 A | 7/1975 | Stahl | |
| 5,271,718 A | 12/1993 | Mitchell, Jr. et al. | |
| 5,634,771 A * | 6/1997 | Howard et al. | 416/241 A |
| 5,931,641 A * | 8/1999 | Finn et al. | 416/229 A |
| 5,988,982 A | 11/1999 | Clauer | |
| 6,155,789 A | 12/2000 | Mannava et al. | |
| 6,301,572 B1 | 10/2001 | Harrison | |
| 6,584,849 B2 | 7/2003 | Loftus et al. | |
| 6,637,209 B2 | 10/2003 | Kuo et al. | |
| 7,008,179 B2 | 3/2006 | Rinck et al. | |
| 7,013,647 B2 | 3/2006 | Nishimura et al. | |

* cited by examiner

*Primary Examiner*—Edward Look
*Assistant Examiner*—Dwayne J White
(74) *Attorney, Agent, or Firm*—Armstrong Teasdale LLP

(57) ABSTRACT

A method facilitates reducing stress in a turbine bucket including a metallic base metal. The method comprises providing a turbine bucket including at least one pocket formed therein, and filling at least one pocket defined in the bucket with a polymer composite having continuous fibers oriented in a resin matrix, such that the fibers have an orientation determined in accordance with a pre-selected frequency tuning of the bucket.

17 Claims, 5 Drawing Sheets

METHODS AND APPARATUS FOR REDUCING STRESS IN TURBINE BUCKETS

BACKGROUND OF THE INVENTION

This invention relates generally to steam turbines, and more particularly to methods and apparatus for reducing stress in turbine buckets.

During operation, turbine buckets are exposed to centrifugal loads, which may induce vibratory stresses in the bucket, cause fatigue in the bucket and/or premature failure. Centrifugal loading may be a function of bucket operating speed, a weight of the bucket, and/or a location of the bucket relative to an engine centerline. As such, one known method of increasing the turbine bucket lifespan includes reducing the weight of the bucket. Additionally, the use of a hybrid bucket design allows for longer last stage buckets that equates to steam turbine output as the area increases. Also, the hybrid construction allows for more aerodynamic (wider chord) airfoils that improve stage efficiency. Lastly, the hybrid construction creates damping in the bucket/stage thereby improving the frequency response of the stage thereby improving reliability.

For turbine buckets or blades, vibratory stresses generally increase when these loads and stresses approach bucket natural resonant frequencies. The magnitude of the vibratory stresses when a bucket vibrates in resonance is proportional to the amount of damping present in the system (wherein damping includes material, aerodynamic and mechanical components) and the stimulus level. For continuously coupled buckets, the frequency of vibration is a function of the entire system of blades, and not necessarily that of individual blades.

In at least some known turbine bucket designs, the weight of the bucket is reduced by fabricating the bucket with hollow pockets which are then filled with a composite or polymer material. The filler material may comprise a polyimide or another type of polymeric resin (or combinations thereof) with continuous glass, carbon, KEVLAR® or other fiber reinforcement to achieve a composite matrix with the original airfoil surface. The pockets reduce the weight of the bucket while the fill material facilitates maintaining the profile and/or strength of the bucket. Composite matrix are now being designed to be used in units that have high bucket temperatures during windage conditions (low flow, high speed "wind milling" of buckets). However, such designs often lack sufficient adhesive bonds between the metal of the turbine bucket and the composite material. Specifically, composites capable of withstanding the engine's high temperatures generally adhere poorly to the bucket metal because the composite material weighs more than the polymer filler material.

For example, U.S. Pat. No. 5,720,597, entitled "Multi-Component Blade for Gas Turbine," describes gas turbine aircraft blades constructed of metal and foam are provided with a composite skin, an erosion coating, or both. Configurations are disclosed that are applicable to fan blades, and more specifically to "propulsion engines." As such, the sizes and shapes of the pockets are significantly limited. Moreover, U.S. Pat. No. 6,139,728, entitled "Poly-Component Blade for a Steam Turbine," discloses configurations similar to those disclosed in U.S. Pat. No. 5,720,597, but for steam turbines. Benefits described include lower weight, which allows less robust blade alignment and thereby reduces cost. However, frequency tuning and damping benefits are not mentioned. Furthermore, U.S. Pat. No. 6,042,338, entitled "Detuned Fan Blade Apparatus and Method," describes a "propulsion engine fan" and various types of blades with different pocket locations, but does not disclose blades of essentially one pocket with different rib structures. In addition, the disclosure is limited to pockets with radial location from a tip to 5%-38% span and chord wise from 15% to 35% from the leading edge and 20% to 45% from the trailing edge with similar limitations on the second or alternative pocket design.

BRIEF DESCRIPTION OF THE INVENTION

In one aspect, a method for reducing stress in a turbine bucket comprising a metallic base metal is provided. The method comprises providing a turbine bucket including at least one pocket formed therein, and filling at least one pocket defined in the bucket with a polymer composite having continuous fibers oriented in a resin matrix, such that the fibers have an orientation determined in accordance with a pre-selected frequency tuning of the bucket.

In another aspect, a bucket assembly for a steam turbine is provided. The bucket assembly includes at least one bucket including a metallic base metal having at least one pocket filled with a polymer composite having continuous fibers bonded in a resin matrix. The fibers are oriented to facilitate a pre-selected frequency tuning of the bucket.

In a further aspect, a turbine bucket including a plurality of window pockets extending through an airfoil wall of the bucket is provided. The plurality of window pockets are positioned to facilitate reducing stress concentrations induced to the bucket. A composite comprising a resin matrix and layers of a fabric material is inserted within the window pocket.

It will be appreciated that configurations of the present invention provide reduced stress reducing stress in turbine buckets.

DETAILED DESCRIPTION OF THE INVENTION

As used herein, an element or step recited in the singular and proceeded with the word "a," "an," or "one" (and especially, "at least one") should be understood as not excluding plural said elements or steps, unless such exclusion is explicitly stated. Furthermore, references to "one embodiment" (or to "other embodiments") of the present invention are not intended to be interpreted as excluding either the existence of additional embodiments that also incorporate the recited features or of excluding other features described in conjunction with the present invention. Moreover, unless explicitly stated to the contrary, embodiments "comprising" or "having" an element or a plurality of elements having a particular property may include additional such elements not having that property.

Figure 1:
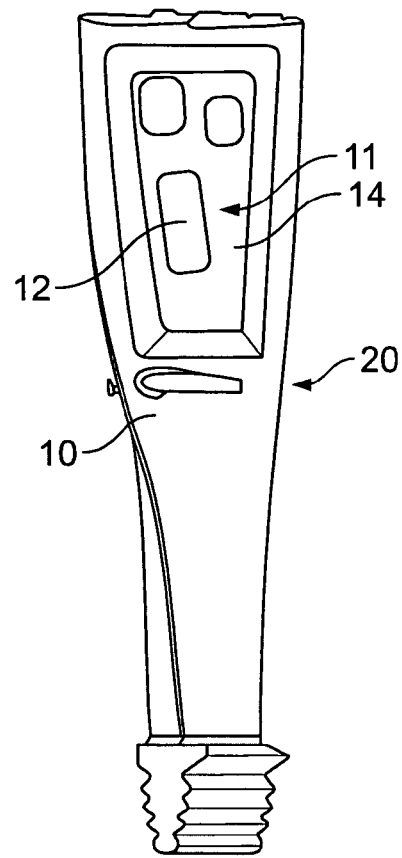
FIG. 1 is a cross-sectional schematic illustration of an exemplary opposed-flow steam turbine engine.

FIG. 1 is a schematic illustration of an exemplary opposed-flow, low-pressure (LP) steam turbine 10. Turbine 10 includes first and second low pressure sections 12 and 14. As is known in the art, each turbine section 12 and 14 includes a plurality of stages of diaphragms (not shown in FIG. 1). A rotor shaft 16 extends through sections 12 and 14. Each LP section 12 and 14 includes a nozzle 18 and 20. A single outer shell or casing 22 is divided along a horizontal plane and axially into upper and lower half sections 24 and 26, respectively, and spans both LP sections 12 and 14. A central section 28 of shell 22 includes a low pressure steam inlet 30. Within outer shell or casing 22, LP sections 12 and 14 are arranged in a single bearing span supported by journal bearings 32 and 34. A flow splitter 40 extends between first and second turbine sections 12 and 14.

Figure 2:
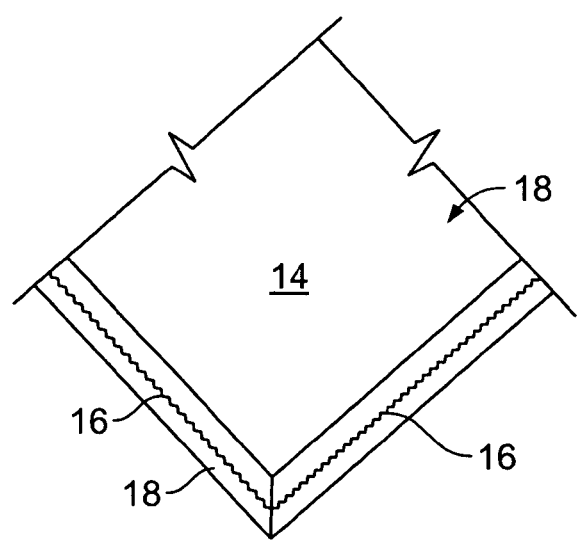
FIG. 2 is a perspective view of an exemplary steam turbine bucket that may be used with the steam turbine shown in FIG. 1.
Figure 3:
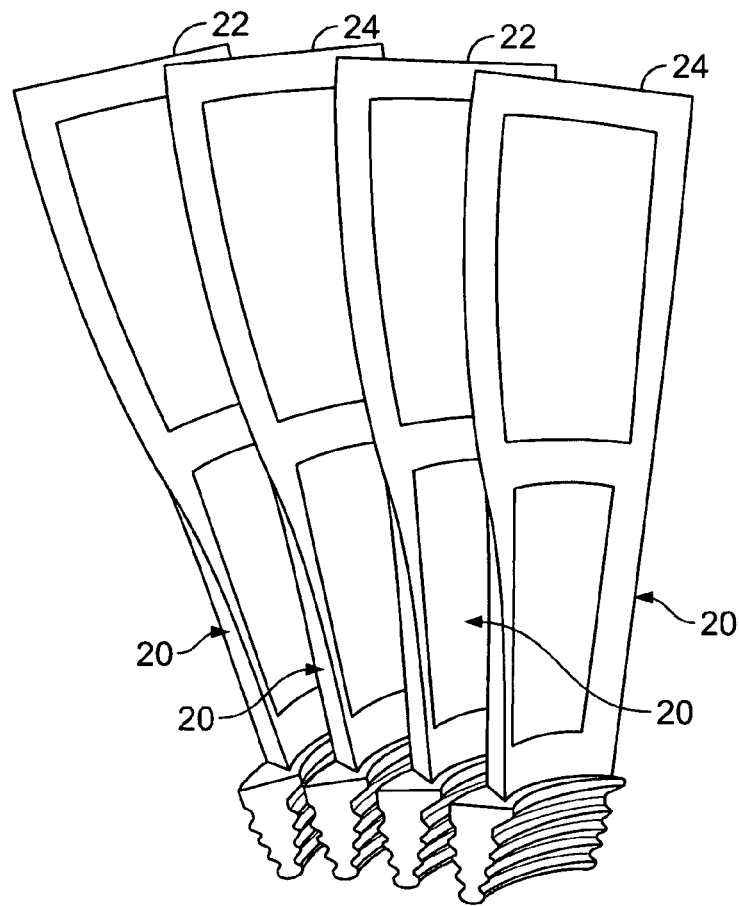
FIG. 3 is a perspective view of a portion of a composite material used to fill a pocket formed in the turbine bucket shown in FIG. 2.

FIG. 2 is a perspective view of a steam turbine bucket 100 that may be used with turbine 10 (shown in FIG. 1). FIG. 3 is a perspective view of a portion of a composite material 101 used to fill a pocket 122 formed in turbine bucket 100. Turbine bucket 100 includes a pressure side 102 and a suction side (not shown in FIG. 2) connected together at a leading edge 104 and a trailing edge 106. Pressure side 102 is generally concave and the suction side is generally convex. Turbine bucket 100 includes a dovetail 108, an airfoil portion 110, and a root 112 extending therebetween. In the exemplary embodiment, airfoil portion 110 and root 112 are fabricated from one unitary piece and are coupled to dovetail 108. In an alternative embodiment, airfoil portion 110, root 112, and dovetail 108 may all be fabricated as a unitary component. In the exemplary embodiment, bucket 100 couples to rotor shaft 16 via dovetail 108 and extends radially outward from rotor shaft 16. In an alternative embodiment, bucket 100 may be coupled to rotor shaft 16 by other devices configured to couple a bucket to a rotor shaft, such as, a blisk.

Bucket dovetail 108 has a length 114 that facilitates securing bucket 100 to rotor shaft 16. As rotor shaft 16 may vary in size, length 114 may also vary to facilitate providing optimal performance of bucket 100 and, more specifically, turbine 10. Root 112 extends radially outward from dovetail 108 and has a length that is approximately equal to dovetail length 114. Airfoil portion 110 extends radially outward from root 112 and also has an initial length that is approximately equal to dovetail length 114. Notably, in the exemplary embodiment, root 112 and airfoil portion 110 are fabricated unitarily together such that there are no seams or inconsistencies in bucket 100 where root 112 transitions to airfoil portion 110.

Airfoil portion 110 extends radially outward from root 112 and increases in length to a tip 116 of bucket 100. In the exemplary embodiment, tip 116 has a length 118 that is longer than length 114. Airfoil portion 110 also has a width (not shown) sized to facilitate locking a snub cover (not shown). As such, tip length 118 and the tip width may vary depending on the application of bucket 100 and, more specifically, turbine 10. Bucket 100 has a radial length 120 measured from dovetail 108 to tip 116. Length 120 is selected to facilitate optimizing performance of bucket 100. As such, bucket length 120 may also vary depending on the application of bucket 100 and, more specifically, turbine 10.

In the exemplary embodiment, bucket 100 also includes a pocket 122 defined within airfoil portion 110. Alternatively, airfoil portion 110 may include more than one pocket 122. Pocket 122 is formed with a bottom surface 124 that is recessed from pressure side 102 of airfoil portion 110. Alternatively, pocket 122 may be formed with a bottom surface 124 that is recessed from the suction side (not shown in FIG. 2). In the exemplary embodiment, pocket 122 is substantially rectangular and has a width 126 and a length 128. Alternatively, as is known in the art, pocket 122 may be formed with any cross-sectional shape that enables bucket 100 to function as described herein. Width 126 and length 128 are selected to ensure that pocket 122 is circumscribed by pressure side 102. In other embodiments, although pocket 122 may be shaped differently, in each configuration, pocket 122 is circumscribed by pressure side 102. The shape of pocket 122 is selected to facilitate optimizing performance of bucket 100.

In some configurations of the present invention, and referring to FIG. 2 and FIG. 3, a method for tuning a row of continuously coupled or freestanding turbine buckets 100 is provided that facilitates reducing the amplitude of vibration and/or damping characteristics. The method includes using a directional fiber 136 orientation in a hybrid bucket configuration. Bucket 100 can be fabricated of a metallic base metal and include a pocket or pockets 122 that can be filled with a polymer composite material 101.

Composite material 101 can be a polyimide based composite material or any other suitable material that enables bucket 100 to function as described herein. Composite material 101 includes fibers 136, such as, but not limited to, glass, carbon, Kevlar or other fibers, which are bonded together, for example, in a resin matrix 138. Fibers 136 may be contained in a single layer 133, in a plurality of layers 133, in one or more layers of fabric, or dispersed throughout matrix 138. The orientation of fibers 136 is selected to facilitate tuning bucket 100 in a particular fashion and/or may be used to "mixed tune" a stage within the turbine 10. In other words, the fiber orientation is determined in accordance to achieve a pre-selected tuning of bucket 100. The frequency characteristic is controlled in some configurations of the present invention by tailoring the orientation of fibers 136 during composite material 101 lay up and cure. By fine tuning the orientation of fibers 136, and/or a weave a fabric including fibers 136, in at least some embodiments, the strength and/or the elastic modulus in different directions of fabric constructed from fibers 136 may be facilitated to be controlled.

Figure 4:
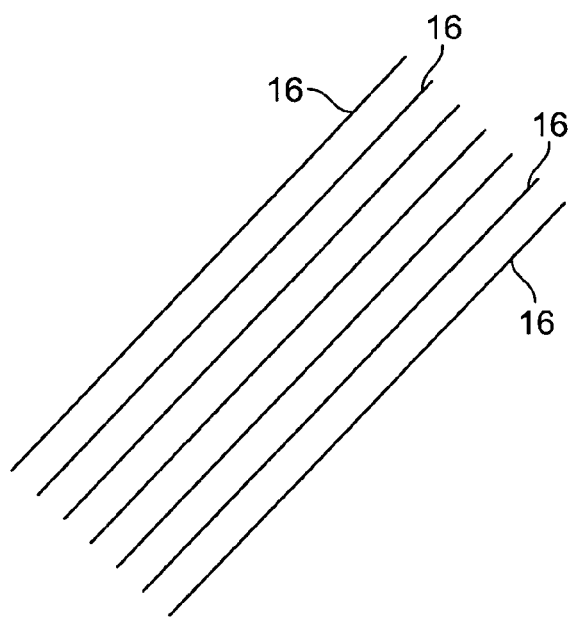
FIG. 4 is a perspective view of some of a plurality of groups of buckets that may, in some configurations, be used with the steam turbine shown in FIG. 1.
Figure 5:
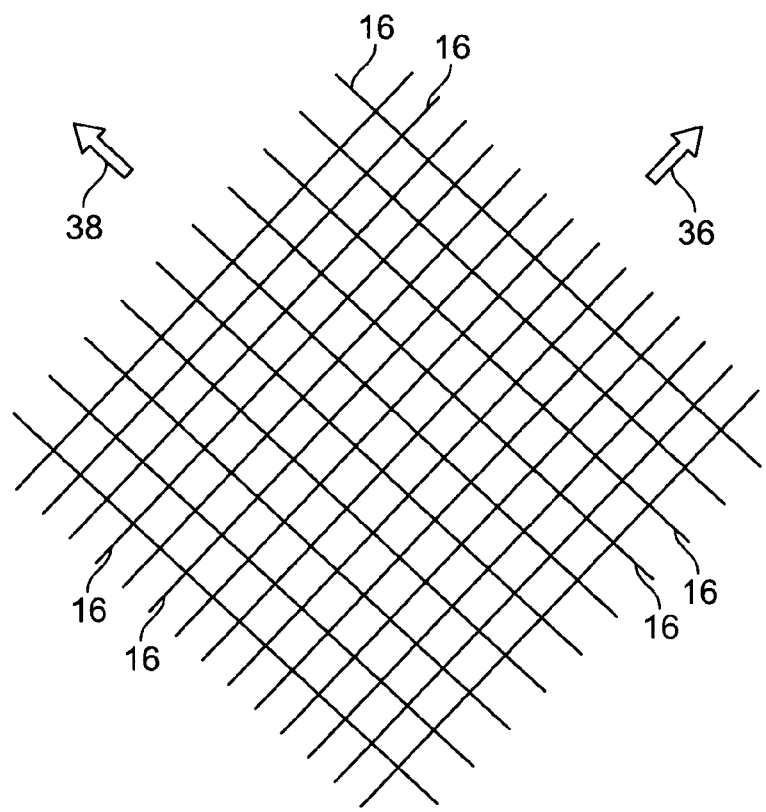
FIG. 5 is an enlarged view of an exemplary uniaxial fiber orientation.
Figure 6:
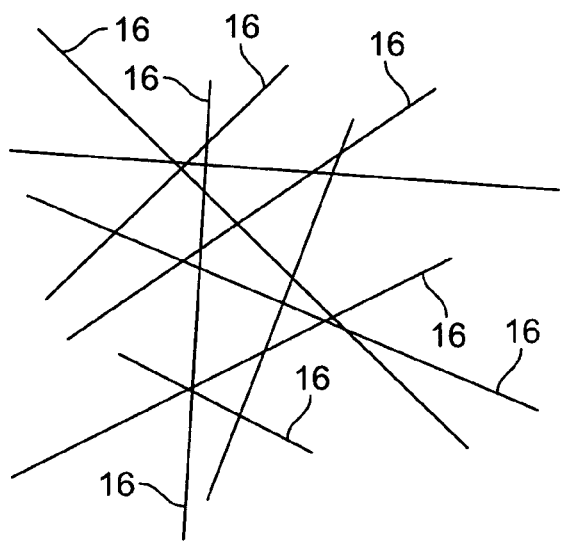
FIG. 6 is an enlarged view of an exemplary biaxial fiber orientation.
Figure 7:
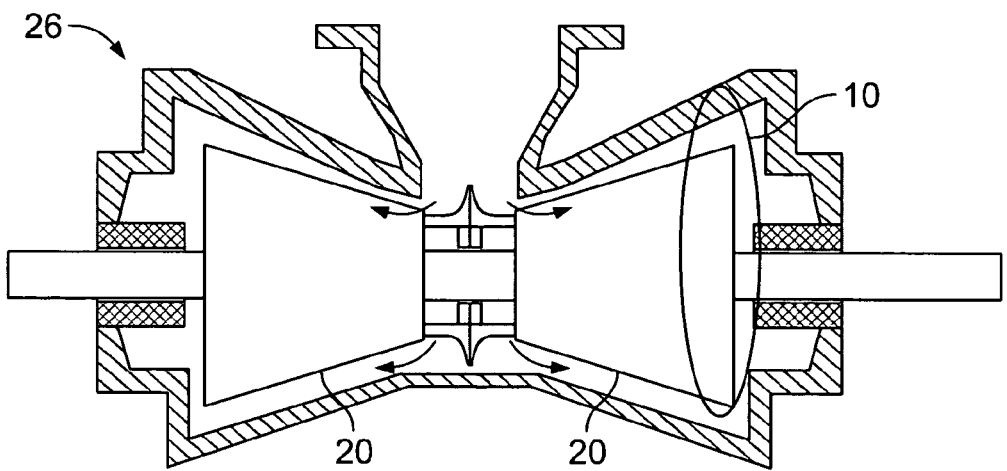
FIG. 7 is an enlarged view of an exemplary quasi-isotropic fiber orientation.

FIG. 4 is a perspective view of a plurality of buckets 100 that may, in some configurations, be used with steam turbine 10 (shown in FIG. 1). FIG. 5 is an enlarged view of an exemplary uniaxial fiber orientation. FIG. 6 is an enlarged view of an exemplary biaxial fiber orientation. FIG. 7 is an enlarged view of an exemplary quasi-isotropic fiber orientation. In some configurations of the present invention, specific orientations of fibers 136 are used to facilitate tuning individual bucket 100 frequencies. "Mixed-tuning" comprises combining a particular group of buckets 142 having one frequency characteristic with one or more other groups of buckets 144 having another frequency characteristic. Bucket groups 142 and 144 are then assembled (e.g., alternately) in a row to form a turbine stage that is assembled to facilitate improved mechanical damping within turbine 10. There may be more than one or two different groups 142 and 144 of blades 100 depending upon the desired end result "mixed tuning."

It should be noted that configurations of the present invention can be used with other steam or gas turbine buckets or blades where permitted by the environment (e.g., gas turbine forward stage compressor blades).

Some configurations of the present invention facilitate detuning of the natural frequencies and dynamic response of a continuously coupled or freestanding bucket 100 without changing the aerodynamic shape and efficiency of each bucket 100. Also, some configurations of the present invention provide the ability to individually tune a bucket 100 or a row of buckets 100, or to tune specific modes that may not meet design requirements without changing the aerodynamic shape and efficiency. Moreover, some configurations of the present invention facilitate tuning an individual bucket frequency using composite orientation to control stiffness in a pocketed area 122 defined within a hybrid bucket 100 without changing the aerodynamic efficiency. Fibers 136 can be oriented in various manners to control the stiffness in any direction that facilitates controling specific bucket natural frequency(s). A composite material 101 can be designed to have significantly different strength and elastic modulus in different directions, i.e., 143 and 145, for example, based on fiber type, weave, and orientation.

Some configurations of the present invention, such as those illustrated for example in FIGS. 5-7, facilitate suppressing the aero-elastic response of a bucket row (continuously coupled or freestanding) via mixed-tuning of the natural frequencies of buckets 100 within the row. These configurations use a hybrid long bucket 100 design in which the adjustment of fibers 136 facilitates improved reinforcement stiffness. Such fiber 136 adjustments can be accomplished using various combinations of fiber materials 136, weaves, and/or orientations to facilitate controlling stiffness in different directions. Buckets 100 of varying frequency and characteristics can also be used to alter the natural frequency of a blade group. These configurations of the present invention produce the at least two distinct groups 142 and 144 of buckets 100. Each group 142 and 144 has the substantially the same aerodynamic shape and external profile, but with different composite fillers 101 within the pockets 122, thereby intentionally altering the natural frequency of the bucket groups 142 and 144. For example, one group 142 uses a higher strength or "stiffer" composite material 101, while the other group 144 uses a lower stiffness or higher damping material 101. Also, for example, in some configurations, a first group 142 uses fibers 136 oriented in a first direction 143 and a second group 144 uses fibers 136 oriented in a second direction 145. Thus, two or more populations of buckets 100 are purposefully manufactured and logically assembled so as to utilize their inherent difference in natural frequencies to damp blade response to synchronous and non-synchronous vibrations, without adversely affecting aerodynamic properties of the blade.

In various configurations of the present invention, either fiber orientation, processing technique, or both, are used to change the primary natural frequency of the individual buckets 100, the particular mode tuning of the continuously coupled row of buckets 100, or both. Thus, in some configurations, the composite lay up has more fibers 136 aligned in a preferred direction, which affects stiffness in a direction of interest to thereby facilitate controling or shifting frequencies. Some configurations of the present invention use several different layers 133 of fabric material oriented in different directions 143 or 145, thereby affecting stiffening in two or more directions, and facilitating stiffness control differently in each of these directions 143 or 145.

In some configurations of the present invention and referring to FIG. 7, a quasi-isotropic layup (such as $[0/45/90/-45]_n$, (where n represents the number of repeating stacking sequences) or randomly oriented long fibers in a matrix (such as sheet molded compounds or "SMCs") is utilized as a "mixed-tuning" device as described above. At least two distinct sets of buckets 100 and corresponding natural frequency responses are arranged in a fashion selected to facilitate reducing the net frequency response of the row of buckets 100.

In some configurations, the fiber orientation is used to mixed tune the row of buckets 100. More particularly, two or more sets of bucket groups 142 and 144, with recessed portions or "pockets" 122, that are defined primarily along the pressure side 102 (shown in FIG. 2) of the bucket 100 are assembled in a ring. These bucket groups 142 and 144 comprise a set of buckets 100 in a stage of the turbine 10. One group of buckets 142 or 144 may be formed with higher resonance frequencies or damping characteristic than the other set or sets of buckets 100. In one example configuration, one group of buckets 100 is configured such that one natural frequency is equally disposed between two "per-rev" criteria (4 per rev and 5 per rev split for example), while another group of buckets has an alternate fiber lay-up orientation configured to be equally disposed about another set of 'per-rev' stimuli (such as a 3 per rev and 4 per rev split). Inherently different damping and frequency response occurs when using different fiber materials and orientation in the composite resin matrix. The composite fiber fabric is used along with a resin binder to create the desired airfoil shape that existed prior to the "pocketing" operation.

Examples of various blade/pocket geometry configurations are illustrated in the Figures. Configurations of the present invention can be used in multiple stages of a turbine depending on the operating temperature and the size of the bucket 100. Configurations of the present invention can also be used in single flow turbine.

Some configurations of the present invention provide a method to reduce shear stress in an adhesive layer between metal and composite as well as to provide a positive mechanical lock of the composite to the bucket. Configurations of the present invention are applicable to composite matrices of one or more different layers 133 of fiber or weave orientation.

Figure 8:
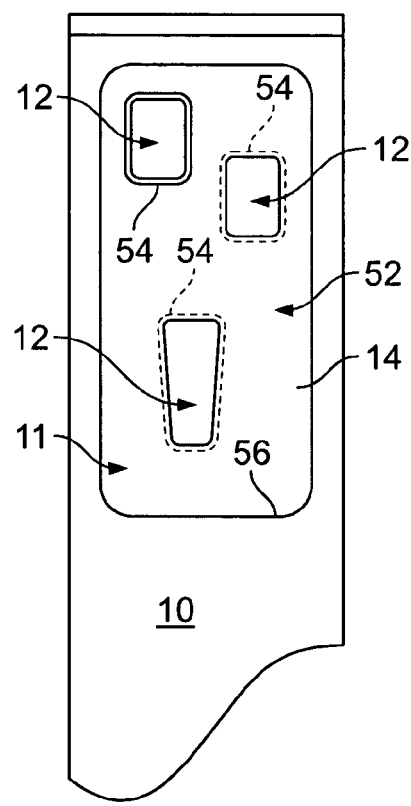
FIG. 8 is a side view of a portion of the bucket shown in FIG. 2. The dashed lines in FIG. 8 represent concave interfaces formed within a multiple window pocket defined in the bucket. More particularly, the solid lines surrounding the windows formed in the pocket represent a convex interface, while the dashed lines surrounding the windows represent concave interfaces.
Figure 9:
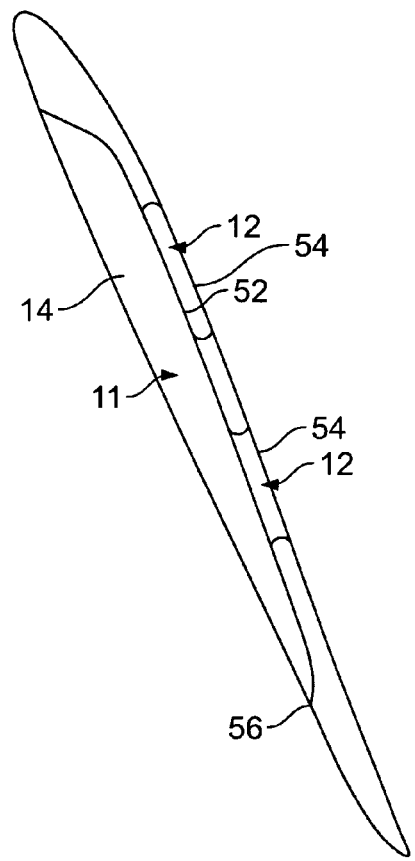
FIG. 9 is a plan view of the portion of the bucket shown in FIG. 8.
Figure 10:
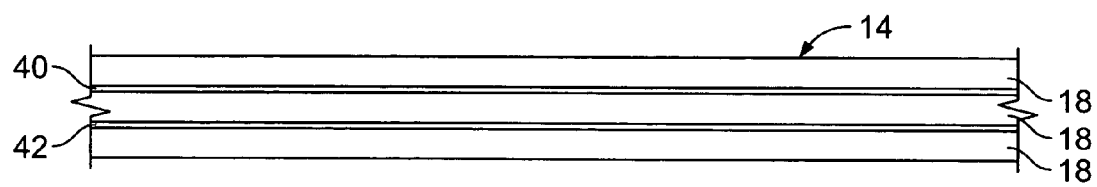
FIG. 10 is a partial side view of an exemplary configuration of composite filler having a plurality of fabric layers, which may be used with the bucket shown in FIGS. 8 and 9.

Figure shown in FIG. 28 is a side view of a portion of bucket 100. The dashed lines in FIG. 8 represent concave interfaces formed within a multiple windowed pocket 122 defined in the bucket 100. More particularly, the solid lines surrounding the windows 160 formed in the pocket 122 represent a convex interface, while the dashed lines surrounding the windows 160 represent concave interfaces. FIG. 9 is a plan view of bucket 100. FIG. 10 is a partial side view of an exemplary configuration of composite filler 101 having a plurality of fabric layers 133, that may be used with bucket 100.

In some configurations of the present invention, a geometric through "window" 160 is formed within pocketed area 122. Pockets 122 in some of these configurations are gradually inclined to an interface 166 defined with a flowpath surface 168 of bucket 100. Windows 160 facilitate a positive mechanical attachment of composite material 101 within bucket 100. Additionally, windows 160 facilitate reducing shear stress in an adhesion layer between composite 101 and metallic bucket 100.

Some configurations of the present invention provide a multiple window 160 configuration that promotes an improved mechanical interface between composite material 101 and a bucket 100. Because of the high stiffness of composite material 101, in the present invention, windows 160 may be formed within an airfoil portion 110 of bucket 100. In contrast, in at least one prior art configuration of hybrid buckets, a polymer material having low temperature capability and very little stiffness was used. Forming a window 160 within a bucket wall having a flexible, low temperature polymer is not possible.

In some configurations of the present invention, pocket 122 geometry configurations include a plurality of windows 160 that extend through bucket wall defining airfoil portion 110. Pockets 122 are either concave or convex around the edge, and the selection of a concave or convex configuration can be made empirically, depending upon that which is most beneficial during the composite lamination process and/or that which has the best retainment characteristics. Windows 160 are located in areas of pocket 122 selected to facilitate minimizing or at least reducing stress concentrations induced to pockets 122 and buckets 100. Windows 160 may have various shapes as determined by finite element analysis of a bucket 100 with windows 160. In some configurations, at least one window 160 uses both a concave and convex surface around the edge of the window 160 as may be determined through empirical testing.

In some configurations of the present invention, composite material 101 includes a fabric 136, such as glass, carbon, Kevlar or other material, configured in layers 133 using a resin binder/filler 138. Layered composite 101 is made, for example, using pre-impregnated unidirectional or woven fabric tape. One other example of a suitable method for making the layered composite comprises injecting resin over the fibers during casting. A high temperature polyimide base is used in some configurations, but other polymers having high temperature capabilities may also be suitable.

Configurations of the present invention are not restricted to only being used along leading edges, but are also applicable to all edges, including, but not limited to, the outboard edge. An inboard edge may see a radial flow field with a high angle of incidence or a pure radial flow from the centrifugal load, causing "wet" steam to flow radially outwards. The undercut has a small or large radius, depending upon the thickness of the airfoil 110 near the edge in question. The undercut would be gradually blended into the back wall of the pocket 122 in such a way as to facilitate reducing stress concentrations.

Some configurations of the present invention use "caul sheets" (not shown) on both sides of the airfoil 110 while the composite material 101 cures in the pocket 122. The caul sheet creates the airfoil shape at places at which the pocket 122 has been machined away. Resin fillers are used to recreate the airfoil shape that existed prior to "pocketing."

Additionally, some configurations of the present invention provide a method for adding an additional mechanical attachment of composite material into a bucket pocket, thereby reducing shear stress in an adhesive layer between the composite and a metallic airfoil. Some configurations of the present invention also add positive mechanical retainment of the composite matrix in the bucket.

Accordingly, and to summarize, some configurations of the present invention provide a method for reducing stress in a turbine bucket 100 comprising a metallic base metal. The method includes filling a pocket or pockets 122 in bucket 100 with a polymer composite 101 having continuous fibers 136 in a resin matrix 138. Fibers 136 have an orientation determined in accordance with a preselected frequency tuning of the bucket 100.

The method can be repeated for a plurality of turbine buckets 100 wherein the preselected frequency tuning of buckets 100 in a first group of buckets 142 is different than the frequency tuning of buckets in second group of buckets 142. Furthermore, some methods includes assembling a first group of buckets 142 and second group of buckets 144 in an alternating pattern, for example, to facilitate mechanical damping of turbine 10. Also, in some configurations, the plurality of turbine buckets 100 have the same external aerodynamic shape and profile, and include at least one group of buckets 142 or 144 that have a higher strength or a stiffer composite material 101 than the material 101 used in the remaining other groups of buckets 100. In some configurations, the method further includes orienting fibers 136 in resin matrix 138 in a different direction in one group of buckets 142 or 144 than an orientation of fibers 136 in the remaining other groups of buckets 100. Some configurations of the present invention further include filling composite 101 with fibers 136 oriented in at least two directions, with more fibers 136 oriented in a first direction 143 than are oriented in a different, second direction 145. Also, some configurations of the present invention include filling composite 101 with a plurality of different layers 133 of fabric material with fiber 136 in the different layers 133 oriented in different directions.

It will thus be appreciated that configurations of the present invention provide reduced stress reducing stress in turbine buckets.

While the invention has been described in terms of various specific embodiments, those skilled in the art will recognize that the invention can be practiced with modification within the spirit and scope of the claims.

What is claimed is:

1. A method for reducing stress in a turbine bucket comprising a metallic base metal, said method comprising:
   providing a turbine bucket including at least one pocket formed therein;
   selecting a frequency to which the bucket is to be tuned;
   determining a fiber orientation usable to tune the bucket to the selected frequency; and
   filling the at least one pocket defined in the bucket with a polymer composite having continuous fibers oriented in a resin matrix, such that the fibers have an orientation determined in accordance with the selected frequency tuning of the bucket, wherein the frequency response of the resulting bucket is approximately equal to the selected frequency.

2. A method in accordance with claim 1 repeated for a plurality of circumferentially-spaced turbine buckets, wherein the pre-selected frequency tuning of the buckets is different between at least a first group of buckets and a second group of buckets, such that mechanical damping of the turbine is facilitated to be reduced.

3. A method in accordance with claim 2 further comprising assembling buckets from the first group of buckets alternately with buckets from the second group of buckets.

4. A method in accordance with claim 2 wherein the plurality of turbine buckets have substantially the same external aerodynamic shape and profile, said method comprises alternately assembling buckets having a higher strength or stiffer composite with buckets having a lower strength composite.

5. A method in accordance with claim 2 wherein the plurality of turbine buckets have substantially the same external aerodynamic shape and profile, said method further comprises orienting fibers in the resin matrix in a different direction in one group of buckets than in the remaining groups of buckets.

6. A method in accordance with claim 1 further comprising filling the composite with fibers oriented in at least two directions, such that at least some fibers are oriented in a first direction that is different than a second direction that at least some of the remaining fibers are oriented.

7. A method in accordance with claim 1 further comprising filling the composite with a plurality of different layers of fabric material such that fibers in the different layers are oriented in different directions.

8. A method in accordance with claim 1 wherein the composite comprises a quasi-isotropic lay-up, said method further comprising arranging two different sets of buckets in a configuration to facilitate reducing a net frequency response of a row of the buckets.

9. A method in accordance with claim 1 wherein the fibers in the composite includes randomly oriented long fibers in the matrix, said method further comprising arranging two different sets of buckets in a configuration to facilitate reducing a net frequency response of a row of the buckets.

10. A bucket assembly for a steam turbine, said bucket assembly configured to be tuned to a pre-selected frequency, said bucket assembly comprising at least one bucket comprising a metallic base metal comprising at least one pocket filled with a polymer composite having continuous fibers bonded in a resin matrix, the resin matrix comprising said fibers oriented in a preconfigured configuration, said configuration enables said bucket to have a frequency that is approximately equal to the pre-selected frequency, said fibers are oriented in at least two directions, such that more of said fibers are oriented in a first direction than in a different second direction.

11. A bucket assembly in accordance with claim 10 wherein said at least one bucket comprises a first group of buckets tuned to a first frequency and a second group of buckets tuned to a different, second frequency, said buckets assembled in a row to facilitate mechanical damping of the turbine.

12. A bucket assembly in accordance with claim 11 wherein said bucket assembly is assembled such that said buckets of said first group are positioned between circumferentially-spaced pairs of said buckets of the second group.

13. A bucket assembly in accordance with claim 11 wherein each of said buckets within each said group of buckets have substantially the same external aerodynamic shape and profile, each of said buckets within said first group have a different composite than buckets of said second group.

14. A bucket assembly in accordance with claim 11 wherein each of said buckets within said first group have substantially the same external aerodynamic shape and profile, each of said buckets in said first group have a higher strength composite than a composite in each of said buckets in said second group.

15. A bucket assembly in accordance with claim 11 wherein each of said buckets within said first group have substantially the same external aerodynamic shape and profile, each of said buckets in said first group have fibers oriented in a different direction than fibers oriented in each of said buckets in said second group.

16. A bucket assembly in accordance with claim 10 wherein said composite comprises a plurality of different layers of fabric material with fibers in the different layers oriented in different directions.

17. A bucket assembly in accordance with claim 10 wherein said composite comprises one of a quasi-isotropic lay-up and randomly oriented long fibers in a matrix, wherein at least two distinct sets of said buckets are arranged in a configuration to facilitate reducing a net frequency response of the turbine.

* * * * *